(12) United States Patent
Wrighton et al.

(10) Patent No.: US 8,479,283 B2
(45) Date of Patent: Jul. 2, 2013

(54) GENERATING SECURITY VALIDATION CODE AUTOMATICALLY

(75) Inventors: David Charles Wrighton, Redmond, WA (US); Robert Sadao Unoki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1734 days.

(21) Appl. No.: 11/564,204

(22) Filed: Nov. 28, 2006

(65) Prior Publication Data

US 2008/0127303 A1 May 29, 2008

(51) Int. Cl.
*G06F 12/14* (2006.01)

(52) U.S. Cl.
USPC .................. 726/22; 726/23; 726/24; 713/164

(58) Field of Classification Search
USPC ........................................ 713/164; 726/22–24
See application file for complete search history.

(56) References Cited

U.S. PATENT DOCUMENTS

| | | | |
|---|---|---|---|
| 5,600,789 A * | 2/1997 | Parker et al. ..................... 714/38 |
| 6,205,492 B1 * | 3/2001 | Shaw et al. .................... 719/321 |
| 6,317,742 B1 | 11/2001 | Nagaratnam et al. |
| 6,601,112 B1 * | 7/2003 | O'Rourke et al. ............ 719/312 |
| 6,876,314 B1 | 4/2005 | Lin |
| 6,892,307 B1 | 5/2005 | Wood et al. |
| 6,988,223 B2 * | 1/2006 | Achtelstetter ................... 714/44 |
| 7,020,785 B2 | 3/2006 | Kim et al. |
| 7,096,491 B2 | 8/2006 | Cheng |
| 7,366,650 B2 * | 4/2008 | Nightingale et al. ........... 703/26 |
| 7,451,435 B2 * | 11/2008 | Hunt et al. ..................... 717/120 |
| 7,546,430 B1 * | 6/2009 | Miller et al. ................... 711/163 |
| 7,587,724 B2 * | 9/2009 | Yeap .............................. 719/328 |
| 7,665,062 B1 * | 2/2010 | Bauer et al. ................... 717/108 |
| 2002/0016777 A1 | 2/2002 | Seamons et al. |
| 2002/0095571 A1 | 7/2002 | Bradee |
| 2003/0236986 A1 * | 12/2003 | Cronce et al. ................. 713/189 |
| 2005/0086632 A1 * | 4/2005 | Oyama ......................... 717/100 |
| 2006/0190606 A1 | 8/2006 | Kohavi |
| 2006/0230461 A1 | 10/2006 | Hauser |
| 2007/0113291 A1 * | 5/2007 | Dai et al. ......................... 726/27 |
| 2007/0209032 A1 * | 9/2007 | Mihai et al. ................... 717/126 |
| 2007/0250927 A1 * | 10/2007 | Naik et al. ....................... 726/22 |

OTHER PUBLICATIONS

Daswani (Daswani et al. "Declarative security", Stanford University, Aug. 1999).*

Strustrup (Bjarne Stroustrup, the C++Programming Language, 3$^{rd}$ Edition, ISBN: 0-201-32755-4, 1997), p. 37-54 and 78-84.*

(Continued)

*Primary Examiner* — Peter Poltorak
(74) *Attorney, Agent, or Firm* — Workman Nydegger

(57) ABSTRACT

A security program code generator is configured to automatically generate program code used to perform one or more validation checks of components operating in user mode. In one implementation, for example, the program code generator receives one or more files that include declarative values and parameters regarding one or more function calls made by any user mode component. The program code generator then takes the file of declarative call descriptions and automatically generates a user mode stub and a kernel mode stub for each function call of interest to be handled by a kernel mode component. The file(s) that include the user mode stub and the kernel mode stub can then be compiled and linked into the operating system components.

10 Claims, 2 Drawing Sheets

OTHER PUBLICATIONS

"A Case for Test-Code Generation in Model-Driven Systems," by Matthew J. Rutherford and Alexander L. Wolf, Department of Computer Science, University of Colorado, Copyright 2003, [online] [retrieved on Nov. 3, 2006], 20 pgs. (377-396). Retrieved from the Internet: http://serl.cs.colorado.edu/~alw/doc/papers/gpce03.pdf.

"Code Generation in the SACRES Project," by Thierry Gautier and Paul Le Guernic, Date Unknown, [online] [retrieved on Nov. 3, 2006], 23 pgs. Retrieved from the Internet: http://www-verimag.imag.fr/SYNCHRONE/SYRF/ HTML98/ann.45.2.1.ps.

* cited by examiner

GENERATING SECURITY VALIDATION CODE AUTOMATICALLY

CROSS-REFERENCE TO RELATED APPLICATIONS

N/A

BACKGROUND

Background and Relevant Art

As computerized systems have increased in popularity, so have the various application programs used on the computerized systems. In particular, there are now a wide range of applications programs configured for any number of purposes, whether to function as complex operating systems, databases, and so forth, or as a simple calculator. In many cases, software developers will write new application programs with a particular operating system in mind, using any number of appropriate languages. Once the software is complete, the developer will compile the application into machine-executable code, which can then be installed on a computer system with the appropriate operating system.

One will appreciate, therefore, that there are a number of considerations that can be made by both the operating system developers as well as the developers of the individual application programs. Many of these interests relate to security and stability. One way developers of an operating system might try to balance these concerns is to allow application program developers to write code in any way they desire, but require that their particular application program run in a "sandbox."

In general, a sandbox is a term for a less-trusted space, such as user mode operation, or operation within a particular user mode address space. While the application program may be allowed to handle generic processes in any sort of way within the sandbox constraints, the operating system will restrict certain sensitive processes. For example, the operating system may deny certain predefined requests (e.g., to allocate specific memory or to access a particular device) outright, or require that certain predefined requests be handled only by one or more trusted components.

For example, an operating system might be configured to allow an application program to run in user mode, and thus require certain sensitive requests to be handled only by a kernel mode component. The application program cannot usually, however, simply make one or more function calls directly to a kernel mode component. In particular, and in order to maintain the integrity of the system, the high-trust code (e.g., operating in kernel mode) will usually need to independently validate each piece of data from the low-trust code (e.g., the application running user mode) before performing the particular request. For example, the high-trust code might run any number of checks to be sure that the data received from the low-trust code contains valid values or requests.

One will appreciate, therefore, that an operating system developer will need to define the sandbox boundaries by defining the types of requests and functions for which the operating system will need to perform a check or validation. To this end, the operating system developer might write one or more user mode and kernel mode "shims" for each function or request, which handle a user mode request, validate the request from a security standpoint, and then ensure the request is in kernel mode where appropriate.

Unfortunately, there can be hundreds of different such shims that are as written for any number of different functions designated within a given operating system. Since each such shim is typically written manually, writing out the code for each such shim can be a cumbersome process, especially when considering the effort needed to write the code for any given operating system.

BRIEF SUMMARY

Implementations of the present invention provide systems, methods, and computer program products configured to automatically generate program code that can be compiled into any number of security validation checks. In particular, implementations of the present invention include one or more tools configured to generate validation code from a set of declarative call descriptions and corresponding parameters. Once compiled, the code can be used by a high-trust component to validate the parameters of a given call made by a low-trust component.

For example, a method of automatically generating program code can involve receiving a file that includes one or more declarative call descriptions of corresponding one or more function calls to be handled by one or more high-trust components. The one or more function calls will be in response to one or more requests from one or more low-trust components. The method can also involve automatically generating one or more sets of program code for each of the one or more declarative descriptions. The one or more sets of program code, in turn, describe one or more security validation checks to be performed on the one or more requests before passing the one or more requests from a low-trust component to a high-trust component.

In addition, another method of automatically generating one or more security validation checks to be used by a high-trust component can involve generating one or more program code instructions to be compiled into one or more operating system components. The program code instructions will include a kernel mode component and a user mode component. The method can also involve identifying one or more function calls to be handled by a kernel mode component, where the one or more function calls are requested by a user mode component.

In addition, the method can involve preparing one or more security input files. In general, the one or more security input files will include one or more declarative call descriptions for each of the one or more function calls. Furthermore, the method can involve passing the one or more security input files to a security validation code generator. The security validation code generator will then create one or more security output files. Still further, the method can involve compiling the one or more security output files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to automatically generate program code that can be compiled into any number of security validation checks. In particular, implementations of the present invention include one or more tools configured to generate validation code from a set of declarative call descriptions and corresponding parameters. Once compiled, the code can be used by a high-trust component to validate the parameters of a given call made by a low-trust component.

Accordingly, one will appreciate that implementations of the present invention can simplify the process of validating an application program's function calls by providing a system that automatically generates validation code. In particular, implementations of the present invention provide one or more advantages over otherwise manually authoring security validation code. Furthermore, implementations of the present invention ensure that security validation code is uniform, and conforms to a minimal set of functions and definitions, and thus can help ensure consistency among validation checks in the system.

Figure 1:
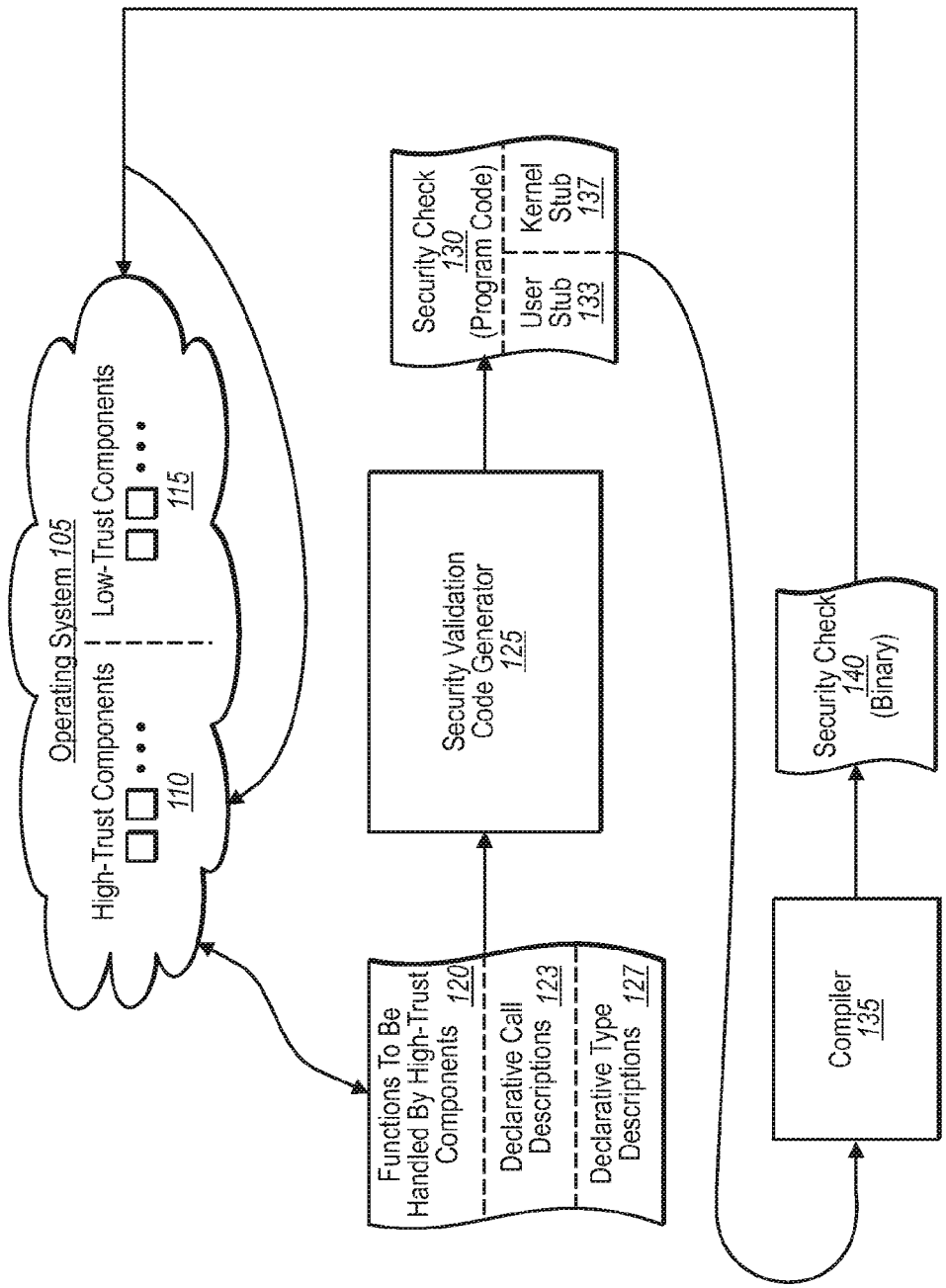
FIG. 1 illustrates an overview schematic diagram in accordance with an implementation of the present invention in which security validation code is generated from a set of one or more declarative values, compiled, and then linked with one or more operating system components.

For example, FIG. 1 illustrates a schematic overview diagram in accordance with an implementation of the present invention. As shown, a generalized computer system 100 can comprise an operating system 105 having a number of different components. In general, these components and modules can comprise any number of computerized instructions that have been compiled and assigned to a particular operating mode. For example, FIG. 1 shows that operating system 105 includes high-trust components 110 and low-trust components 115. High-trust components will generally be understood to include components that operate in a kernel mode or a kernel layer. Conversely, low-trust components will be understood as components operating in a restricted user mode or user layer. For example, low-trust components can include application programs, as well as any number or type of operating system components that interact with user mode application programs.

When a developer is developing one or more operating systems, or operating system components such as 110 and 115, the developer will identify the various functions that define the restrictions for a particular space or mode. For example, the developer will define various restrictions that constitute function calls to be allowed for user mode components. Similarly, the developer will define function calls that should not be performed by a user mode component, and should only be performed by one or more kernel mode components on behalf of the user mode component.

For example, the developer may declare that a "file open" request involves a number of security checks, and that the actual act of the file open command be handled only by a kernel mode component. Thus, when a user mode application program attempts to execute a file open command, operating system 105 will direct the request to one or more components operating in kernel mode. For example, one kernel mode component might be configured to evaluate the file open request, which might include evaluating the file name, the length of the file name string, the path of the file name, and so forth. In general, these and other types of security checks are configured to ensure that inappropriate requests (e.g., non-existing files, path names as that are longer than allowed) do not cause a system fault, and/or allow a low-trust component access to sensitive operating system 105 components.

Thus, when preparing a given operating system (e.g., 105), the developer will want to identify any number of functions that help maintain the integrity of the system. When developing these operating systems components, such as 110 and 115, etc., the developer will create a file 120 that identifies functions to be handled by high-trust components (e.g., previously described file open example). The developer can also include in file 120 any one or more declarative type descriptions 127, which include types to be associated with each call parameter. In addition, the developer can include in file 120 any one or more declarative call descriptions 123 (or "declarative descriptions") associated with the particular functions requiring security validation checks.

For example, declarative call descriptions 123 can include such things as a set of parameters passed to the function call, a description of a data type for each parameter, information about whether each parameter is passed into the function call, returned from the function call, or both. The declarative call descriptions 123 can also include such things as a set of states that system 105 will need to be in before processing the requested function. In addition, the declarative call descriptions 123 can include any custom validation techniques (if any) associated with the function call. Furthermore, the declarative call descriptions 123 can include such information as whether the low-trust code must prepare the data in a particular way before the data can be validated.

The following code in Example 1 represents one way in which the declarative call descriptions 123 can be written in one operating environment.

EXAMPLE 1

```
type PItemDescriptor
{
   C = struct_itemDesc *,
   {
     lowtrust_setup
     {
        CONVERTER=GetItemDescHandle([n]PItemDescriptor, [out] HANDLE),
     },
     hightrust_validation
     {
        VALIDATOR=GetItemDescFromHandle([in] HANDLE, [out] PItemDescriptor)
     }
   }
}
// other type descriptions...
[ValidateExState=InManagedAppDomain]
[NeedsLowTrustSetup]
INT32 EE_GetRuntimeHandle(
         [in]PItemDescriptor pDesc,
         [in]wchar *s);
```

Upon preparing file 120 with the corresponding declarative call descriptions 123, FIG. 1 shows that file 120 can then be passed to a security validation code generator 125. In general, the security validation code generator can include any kind of code generator. In accordance with implementations of the present invention, however, code generator 125 can include a number of different extensions that allow the code generator to not just write code, but also to write security validation check code in accordance with declarative values.

In at least one implementation, for example, such extensions configure the code generator 125 to examine each declarative call description 123, and further examine each parameter in turn. Specifically, security validation code generator 125 can be configured to match each parameter of a declarative call description to a corresponding type description (e.g., 127), and a set of annotations. With respect to Example 1 above, for example, security validation code generator 125 can be configured to handle the "pDesc parameter" by examining the pDesc parameter, and subsequently generating code appropriate for performing a corresponding security validation.

In one implementation, security validation code generator 125 can be configured to perform a security validation on a parameter of type PItemDescription with an annotation of "[in]." Where the type description (e.g., 127) for the type PItemDescription does not specify a specific operation for the annotation "[in]," the standard set of marshalling to move the data from user mode to kernel mode can then be performed in the generated code. For example, security code generator 125 can generate code by utilizing "lowtrust_setup" information in the type descriptor in a user mode "stub," and utilizing "hightrust_validation" information in a kernel mode "stub."

Accordingly, security validation code generator 125 can be configured to generate a pair of "stub" functions, such as a user stub 133 and a kernel stub 137. In general, the "stub" (133, 137) comprises binary code (once compiled) that interfaces with a particular software component or API (or is included therewith) and performs a particular function in response to a request from the associated software component or API. In one implementation, for example, the user stub 133 can be configured to receive parameters such as those described in the declarative values of file 120, from an application that makes a request. The user stub 133 can then perform a translation on these parameters, transforming the received parameters into parameters that a corresponding kernel stub 137 can validate. In other cases, however, the parameters may not need to be translated or transformed.

Either way, the user mode stub 133 is also configured to pass the set of parameters (that can be validated) across the kernel/user mode boundary to kernel as stub 137. The kernel mode stub 137, in turn, receives the set of parameters and begins processing. In particular, security validation code generator 125 can be configured to generate a kernel mode stub 137, which, in turn, is configured to execute a number of functions.

For example, the generated kernel mode stub 137 can be configured to validate that system 105 is in the correct state to make the requested function call. The kernel mode stub 137 can also be configured to allocate kernel mode buffers for all buffer parameters. For example, the kernel mode stub 137 may allocate space may on either the stack or the heap, depending on the parameter type. In addition, the kernel mode stub 137 can be configured to copy user mode-allocated buffers into the newly allocated kernel mode buffers. In one implementation, this is only done for parameters that pass data "in" to the requested function.

The kernel mode stub 137 can also be configured to call validation logic for each parameter, and call any method-specific validation logic. In addition, the kernel mode stub 137 can be configured to make the call, and, upon making the call, call method-specific "after-call" logic, as well as after-call logic for each parameter. Furthermore, the kernel mode stub 137 can still be configured to copy buffer data from kernel mode into a user mode-supplied buffer. In general, however, this will typically be done for parameters that pass data "out" of the requested function. Finally, the kernel mode stub 137 can be configured to free the kernel mode buffers, and return.

FIG. 1 thus shows that upon receiving file 120, security validation code generator 125 creates security check file 130, which includes program code for the above-described user mode and kernel mode stubs 133, 137. One will appreciate that program code 130 be generated by security validation code generator 125 in any number or type of compilable programming languages, such as C, C# ("C sharp"), etc. In particular, upon creating program code 130, program code 130 can then be compiled through compiler 135, which produces a binary form 140 of the security validation checks (including the user and kernel mode stubs).

The compiled form can then be linked up into operating system 105. In particular, operating system 105 can be configured so that any low-trust component or API that executes a function (or requests execution of a function) that is deemed by the declarative values in file 120 to be handled by a kernel mode component will be handled initially by a user stub 137. As previously described, the user stub 137 will perform any number of response functions to handle the request, which in turn are validated, continued and/or finished by kernel mode stub 137 and a corresponding kernel mode component. Thus, any time a low-trust component 115 receives, or needs to pass on, an operating system's request to any particular kernel mode component, the low-trust component 115 will do so through the user mode and kernel mode stub interfaces.

Figure 3:
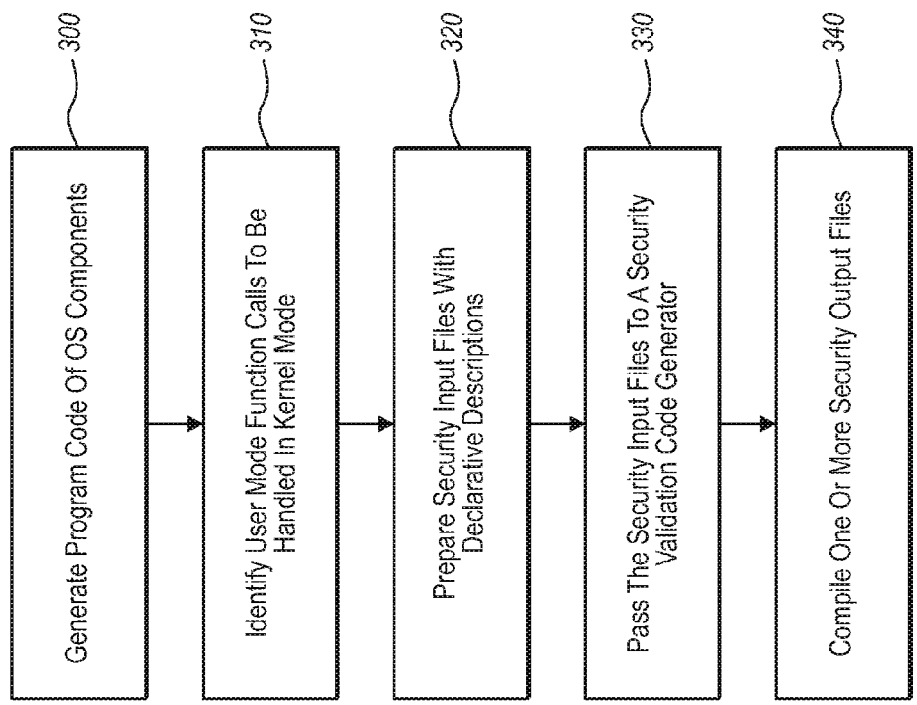
FIG. 3 illustrates a flowchart of a sequence of acts in a method from the perspective of a user for creating one or more security output files.
Figure 2:
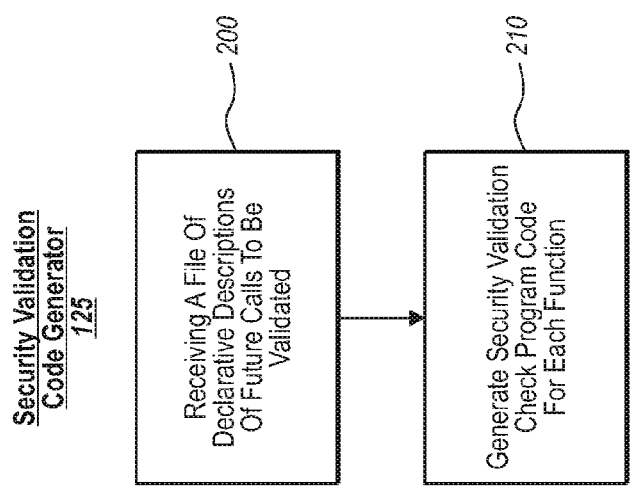
FIG. 2 illustrates a flowchart of a sequence of acts in a method from the perspective of a security validation code generator for generating security validation code.

Implementations of the present invention can also be described in terms of one or more acts in a method for accomplishing a particular result. In particular, FIGS. 2 and 3 illustrate flow charts for automatically generating program code and for developing program code that can be used for one or more security validation checks. The acts illustrated in FIGS. 2 and 3 will be described below with respect to the components and diagrams of FIG. 1.

For example, FIG. 2 shows that a method from the perspective of security validation code generator 125 of automatically generating program code to be used for one or more security validation checks can comprise a step 200 of receiving a as file of declarative call descriptions 123 to be validated. Step 200 includes receiving a file comprising one or more declarative call descriptions 123 of corresponding one or more function calls to be handled by one or more high-trust components in response to one or more requests from one or more low-trust components. For example, FIG. 1 shows that a developer has prepared file 120, which includes declarative call descriptions 123 of functions requested that are to be handled by high-trust components, such as one or more components operating in kernel mode.

FIG. 2 also shows that the method can comprise a step 210 of generating security validation check program code for each function. Step 210 includes automatically generating one or more sets of program code for each of the one or more declarative call descriptions, wherein the one or more sets of program code describe one or more security validation checks to be performed on the one or more requests before passing the one or more requests from a low-trust component to a high-trust component. For example, FIG. 1 shows that security validation code generator 125 receives input file 120 and creates program code 130. Program code 130, in turn, includes a user stub 133 and a kernel stub 137, which, when compiled, will link and/or interface with one or more operating system components 110, 115.

In addition to the foregoing, FIG. 3 illustrates that a method of automatically generating one or more sets of program code for one or more security validation checks of a low-trust component request comprises an act 300 of generating program code of operating system components. Act 300 includes generating one or more program code instructions to be compiled into one or more operating system components, including at least one of a kernel mode component and a user mode component. For example, during development of an operating system, a one or more components are created that are ultimately compiled into low-trust components 115 and high-trust components 110.

FIG. 3 also shows that the method can comprise an act 310 of identifying user mode functions calls to be handled in kernel mode. Act 310 includes identifying one or more function calls to be handled by a kernel mode component, wherein the one or more function calls are requested by a user mode component. For example, a developer of operating system 105 identifies that a number of the different functions that may be ordinarily be handled by a low-trust component should alternatively be handled by high-trust components 110. Such requests could include file open requests, allocations of memory, and so forth.

In addition, FIG. 3 shows that the method can comprise an act 320 of preparing security input files with declarative call descriptions. Act 320 includes preparing one or more security input files, the one or more security input files including one or more declarative call descriptions for each of the one or more function calls. For example, a file 120 is prepared with an indication that "file open" is a function that should be handled by a high-trust component. File 120 also includes the values associated with the function (e.g., "file open") that need to be used for a security validation check. With respect to the "file open" example, the values could include information regarding acceptable file names, as well as an acceptable string length of the file name, and so forth.

Furthermore, FIG. 3 shows that the method can comprise an act 330 of passing the security input files to a security validation code generator. Act 330 includes passing the one or more security input files to a security validation code generator, wherein one or more security output files are created. For example, FIG. 1 shows that the developer can pass file 120 as input to security validation code generator 125, whereupon security validation code generator 125 creates program as code in the form of one or more security function checks in file 130. In general, program code 130 will include a user stub 133 and a kernel stub 137.

Still further, FIG. 3 shows that the method can comprise an act 340 of compiling one or more security output files. Act 340 includes compiling the one or more security output files. For example, as shown in FIG. 1, compiler 135 takes the security check program code output 130 as input, and compiles program code 130 into one or more binary forms 140. The developer can then link up with the binary forms of the kernel stub 137 and user stub 133 with corresponding operating system 105 components 110 and 115, respectively.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

Computer-readable media may be divided into two categories: computer storage media, and communication media. Computer storage media includes RAM, ROM, EEPROM, CD-ROM or other optical disk storage, magnetic disk storage or other magnetic storage devices. Computer storage media, however, does not include signals. Communication media on the other hand includes signals and the media used to transmit signals. For example, when information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, performed by a computer having an operating system that executes code in a kernel mode and a user mode, for automatically generating validation code for validating parameter values of restricted function calls made by a component running in user mode, the method comprising:
   receiving, at a security validation code generator, one or more security input files that define:
   (1) a set of restricted function calls of an operating system that only a component running in kernel mode is enabled to make;
   (2) declarative call descriptions that define each parameter of each restricted function call as well as whether the parameter is an input or an output of the restricted function call; and
   (3) declarative type descriptions that define the type of each parameter of the restricted function calls as well as logic for validating parameters of each type;
   automatically generating, by the security validation code generator, a security check file that includes program code that implements a user mode and a kernel mode stub for validating each restricted function call that is configured to be made by a user mode component, wherein the code for validating each restricted function call within the user mode and kernel mode stubs is automatically generated from the declarative call descriptions by matching each parameter of a restricted function call to a corresponding type description and generating the code using the defined logic within the corresponding type description;
   compiling the security check file to create the executable user mode and kernel mode stubs;
   linking the user mode and kernel mode stubs into the operating system; and
   upon a user mode component invoking one of the restricted function calls, executing the user mode and kernel mode stubs to validate the parameters of the restricted function call.

2. The method of claim 1, wherein the declarative call descriptions corresponding to at least one of the function calls further describe a set of states that the computer must have for the corresponding function call to be valid.

3. The method of claim 1, wherein executing the user mode stub comprises converting the parameters of the restricted function call into appropriate parameters to be passed to the kernel mode stub which validates the translated parameters.

4. The method of claim 2, wherein executing the kernel mode stub further comprises evaluating the state of the computer to determine whether it meets the set of states specified in the declarative call descriptions corresponding to the invoked restricted function call.

5. The method of claim 1, wherein executing the kernel mode stub further comprises executing pre-call validation logic for one or more input parameters of the restricted function call prior to performing the restricted function call, and executing post-call logic to validate one or more output parameters of the restricted function call that are returned by the restricted function call.

6. A computer storage device storing computer executable instructions which when executed, by a processor on a computer having an operating system that executes code in a kernel mode and a user mode, perform a method for automatically generating validation code for validating parameter values of restricted function calls made by a component running in user, made the method comprising:
   receiving, at a security validation code generator, one or more security input files that define:
   (1) a set of restricted function calls of an operating system that only a component running in kernel mode is enabled to make;
   (2) declarative call descriptions that define each parameter of each restricted function call as well as whether the parameter is an input or an output of the restricted function call; and
   (3) declarative type descriptions that define the type of each parameter of the restricted function calls as well as logic for validating parameters of each type;
   automatically generating, by the security validation code generator, a security check file that includes program code that implements a user mode and a kernel mode stub for validating each restricted function call that is configured to be made by a user mode component, wherein the code for validating each restricted function call within the user mode and kernel mode stubs is automatically generated from the declarative call descriptions by matching each parameter of a restricted function call to a corresponding type description and generating the code using the defined logic within the corresponding type description;
   compiling the security check file to create the executable user mode and kernel mode stubs;
   linking the user mode and kernel mode stubs into the operating system; and
   upon a user mode component invoking one of the restricted function calls, executing the user mode and kernel mode stubs to validate the parameters of the restricted function call.

7. The computer storage device of claim 6, wherein the declarative call descriptions corresponding to at least one of the function calls further describe a set of states that the computer must have for the corresponding function call to be valid.

8. The computer storage device of claim 6, wherein executing the user mode stub comprises converting the parameters of the restricted function call into appropriate parameters to be passed to the kernel mode stub which validates the translated parameters.

9. The computer storage device of claim 7, wherein executing the kernel mode stub further comprises evaluating the state of the computer to determine whether it meets the set of states specified in the declarative call descriptions corresponding to the invoked restricted function call.

10. The computer storage device of claim 6, wherein executing the kernel mode stub further comprises executing pre-call validation logic for one or more input parameters of the restricted function call prior to performing the restricted function call, and executing post-call logic to validate one or more output parameters of the restricted function call that are returned by the restricted function call.

* * * * *